(12) United States Patent
Tewes et al.

(10) Patent No.: US 12,495,961 B2
(45) Date of Patent: Dec. 16, 2025

(54) HANDHELD INTRAORAL DENTAL 3D CAMERA

(71) Applicant: DENTSPLY SIRONA Inc., York, PA (US)

(72) Inventors: Michael Tewes, Brühl (DE); Andreas Unger, Gross-Gerau (DE)

(73) Assignee: Dentsply Sirona, Inc., York, PA (US)

( * ) Notice: Subject to any disclaimer, the term of this patent is extended or adjusted under 35 U.S.C. 154(b) by 470 days.

(21) Appl. No.: 18/007,558

(22) PCT Filed: May 21, 2021

(86) PCT No.: PCT/EP2021/063577
§ 371 (c)(1),
(2) Date: Dec. 1, 2022

(87) PCT Pub. No.: WO2021/254724
PCT Pub. Date: Dec. 23, 2021

(65) Prior Publication Data
US 2023/0210356 A1    Jul. 6, 2023

(30) Foreign Application Priority Data

Jun. 18, 2020  (EP) .................................. 20180762

(51) Int. Cl.
*A61B 1/24*    (2006.01)
*A61B 1/00*    (2006.01)
(Continued)

(52) U.S. Cl.
CPC .......... *A61B 1/247* (2013.01); *A61B 1/00009* (2013.01); *A61B 1/00045* (2013.01);
(Continued)

(58) Field of Classification Search
None
See application file for complete search history.

(56) References Cited

U.S. PATENT DOCUMENTS

| | | | |
|---|---|---|---|
| 7,312,924 B2 * | 12/2007 | Trissel | A61C 9/0053 359/489.08 |
| 8,570,530 B2 * | 10/2013 | Liang | G01B 11/25 356/601 |

(Continued)

FOREIGN PATENT DOCUMENTS

| | | |
|---|---|---|
| CN | 104791717 A | 7/2015 |
| CN | 106999020 A | 8/2017 |

(Continued)

OTHER PUBLICATIONS

International Search Report; PCT/EP2021/063577; Aug. 4, 2021 (completed); Aug. 12, 2021 (mailed).

(Continued)

*Primary Examiner* — Samira Monshi
(74) *Attorney, Agent, or Firm* — SCHWEGMAN LUNDBERG & WOESSNER, P.A.

(57) ABSTRACT

The present invention, a handheld intraoral dental 3D camera comprising: a hand-held housing which includes: an optical unit comprising: an illuminating means for producing light, and a projecting means for projecting the light produced by the illuminating means onto a region of a tooth surface of a patient; a sensing unit for sensing an image of the projected light reflected by the region, characterized in that the illuminating means comprises a semiconductor laser for producing the light; and the projection means comprises phosphor which is arranged to receive the light produced by the semiconductor laser, wherein the projection means is further adapted to project the fluorescing light from the phosphor onto the region of the tooth surface of the patient.

7 Claims, 3 Drawing Sheets

(51) Int. Cl.
- *A61B 1/04* (2006.01)
- *A61B 1/06* (2006.01)
- *A61B 1/12* (2006.01)
- *A61B 1/247* (2006.01)

(52) U.S. Cl.
CPC ............ *A61B 1/00194* (2022.02); *A61B 1/04* (2013.01); *A61B 1/063* (2013.01); *A61B 1/0653* (2013.01); *A61B 1/128* (2013.01); *A61B 1/24* (2013.01)

(56) References Cited

U.S. PATENT DOCUMENTS

| | | | | |
|---|---|---|---|---|
| 9,675,430 | B2* | 6/2017 | Verker | A61C 9/0066 |
| 2007/0147033 | A1 | 6/2007 | Ogawa | |
| 2016/0022389 | A1* | 1/2016 | Esbech | A61C 9/0066 |
| | | | | 250/208.1 |
| 2018/0149955 | A1 | 5/2018 | Akiyama | |
| 2019/0376784 | A1 | 12/2019 | Tewes | |
| 2019/0380568 | A1 | 12/2019 | Duan et al. | |

FOREIGN PATENT DOCUMENTS

| | | |
|---|---|---|
| CN | 108459409 A | 8/2018 |
| EP | 3925516 B1 | 8/2023 |
| JP | 2010207465 A | 9/2010 |
| JP | 2013111176 A | 6/2013 |
| JP | 2013165749 A | 8/2013 |
| JP | 2017037189 A | 2/2017 |
| JP | 2021527207 A | 10/2021 |
| JP | 2023531377 A | 7/2023 |
| WO | 2012002254 A1 | 1/2012 |
| WO | WO-2013094569 A1 | 6/2013 |

OTHER PUBLICATIONS

Written Opinion of the International Searching Authority; PCT/EP2021/063577; Aug. 4, 2021 (completed); Aug. 12, 2021 (mailed).

"Chinese Application Serial No. 202180043043.6, Office Action mailed May 28, 2025", W/English Translation, 15 pgs.

"European Application Serial No. 20180762.5, Extended European Search Report mailed Nov. 12, 2020", 6 pgs.

"European Application Serial No. 20180762.5, Response filed May 3, 2022 to Extended European Search Report mailed Nov. 12, 2020", 20 pgs.

"International Application Serial No. PCT/EP2021/063577, International Preliminary Report on Patentability mailed Dec. 29, 2022", 7 pgs.

"Japanese Application Serial No. 2022-573328, Notification of Reasons for Refusal mailed Mar. 18, 2025", w/ English Translation, 6 pgs.

"Japanese Application Serial No. 2022-573328, Response filed Jun. 6, 2025 to Notification of Reasons for Refusal mailed Mar. 18, 2025", W/English Claims, 11 pgs.

"Chinese Application Serial No. 202180043043.6, Response filed Sep. 23, 2025 to Office Action mailed May 28, 2025", W English Claims, 5 pgs.

"Japanese Application Serial No. 2022-573328, Examiners Decision of Final Refusal mailed Sep. 24, 2025", W English Translation, 7 pgs.

* cited by examiner

HANDHELD INTRAORAL DENTAL 3D CAMERA

CROSS-REFERENCE TO RELATED APPLICATIONS

This is a National Phase application of International Application No. PCT/EP2021/063577, filed May 21, 2021, which claims the benefit of and priority to European Application Ser. No. 20180762.5, filed on Jun. 18, 2020, which are herein incorporated by reference for all purposes.

TECHNICAL FIELD OF THE INVENTION

The present invention relates to a handheld intraoral dental 3D camera. The present invention also relates to a 3D imaging system using the handheld intraoral dental 3D camera for generating an image of the tooth surface of a patient.

BACKGROUND OF THE INVENTION

Handheld intraoral dental 3D camera are commonly used in the dental treatments. A handheld intraoral dental 3D camera has an image sensing unit for sensing images of the projection light reflected by a region of a tooth surface of a patient. The handheld intraoral dental 3D camera is usually connected to a 3D imaging system which has a 3D image processing unit for generating a 3D image of at least part of the tooth surface of the patient based on the sensed images. In a commonly known method, the projection light includes a pattern which enables the generation of the 3D image. Alternative techniques are also commonly known to those skilled in the art. The generated 3D image is displayed on a display to the user and can be used by a CAD/CAM software for producing restorations/appliances and the like. The optical unit of the handheld intraoral dental 3D camera generally has illuminating means for producing light, and a projecting means for projecting the light produced by the illuminating means onto a region of a tooth surface of a patient. In the prior art, LEDs are used in the illuminating means for the production of light. For example, US 2019/0376784 A1 discloses a handheld intraoral dental 3D camera having array of LEDs. The LEDs are limited in their luminance by the currently available technology. The size of the available high-power LED chips is usually 1 mm$^2$, and only part of the emitted light can be used. An enlargement of the light source to increase the emitted light flux is not effective because the additional light cannot be passed through the imaging optics because of the etendue. The power supplied to the light source is therefore power loss and only leads to heating of the handheld intraoral dental 3D camera.

SUMMARY OF THE INVENTION

An objective of the present invention is to overcome the problems of the prior art and provide a handheld intraoral dental 3D camera which can achieve a high illuminance.

This objective has been achieved through the handheld intraoral dental 3D camera as defined in claim 1. The dependent claims relate to further embodiments and developments.

The present invention provides a handheld intraoral dental 3D camera comprising: a hand-held housing which includes: an optical unit comprising: an illuminating means for producing light, and a projecting means for projecting the light produced by the illuminating means onto a region of a tooth surface of a patient; a sensing unit for sensing an image of the projected light reflected by the region. The illuminating means comprises a semiconductor laser for producing the light, and the projection means comprises phosphor which is located at a position remote from semiconductor laser and arranged to receive the light produced by the semiconductor laser. The projection means is further adapted to condense the light of the semiconductor laser onto the phosphor, and to project the fluorescing light from the phosphor onto the region of the tooth surface of the patient. The phosphor is located remote from the semiconductor laser.

A major advantageous effect of the present invention is that thanks to the semiconductor laser the illuminance of the optical unit of the handheld intraoral 3D dental camera as well as the brightness of the projected light can be increased without requiring an increase in the size of the optical unit, and without causing more waste heat or loss in the depth of field. Another major advantageous effect of the present invention is that thanks to the phosphor, the noise, in particular the speckle caused by the coherent light of the semiconductor laser can be completely suppressed or reduced in as much as possible. Another major advantageous effect of the present invention is that a higher imaging accuracy can be achieved in the 3D image due to the improved brightness and the reduced noise. Another major advantageous effect of the present invention is that more dense 3D image data can be acquired even in problematic areas e.g. steep tooth flanks due to the improved brightness. Another major advantageous effect of the present invention is that higher frame rates can achieved, thereby the tear resistance can be improved due to the improved brightness. Another major advantageous effect of the present invention is that thanks to the semiconductor laser the waste heat can be reduced; thereby the battery life can be improved, and the size and weight can be reduced.

In an embodiment, the handheld intraoral dental 3D camera is preferably provided with a cooling plate as a heat sink for cooling the phosphor. The phosphor is preferably arranged on a reflective section that is in thermal contact with the cooling plate. The phosphor is concentrated within a relatively small area preferably having a diameter substantially in the range of 0.1 mm to 1 mm which matches the size of the condensed light.

In an embodiment, the semiconductor laser emits light within the range of 350 nm to 470 nm. The semiconductor laser preferably emits blue light. Alternatively, a semiconductor which emits UV light may be used.

In an embodiment, the projection means includes at least a first lens, a dichroic mirror and a second lens arranged in the given order along the optical path between the semiconductor laser and the phosphor.

According to the present invention the 3D image generation is preferably achieved by using a pattern. Alternative techniques may be also used. Therefore, in an embodiment, the projection means generates a pattern with the fluorescent light emitted by the phosphor, and projects the generated pattern onto the region of the tooth surface of the patient.

The present invention also provides a 3D imaging system which is connectable with the handheld intraoral dental 3D camera. The 3D imaging system has a 3D image processing unit for generating a 3D image of at least part of the tooth surface of the patient based on the sensed images, and a display for displaying the 3D image to a user. The 3D imaging system preferably has a CAD/CAM module on which a CAD/CAM software can be executed. The CAD/CAM software uses the generated 3D image for dental treatment, in particular for the construction of restorations, appliances, implants and the like. The CAD/CAM module is connectable to peripheral device such a dental milling machine and the like.

BRIEF DESCRIPTION OF THE DRAWINGS

In the subsequent description, further aspects and advantageous effects of the present invention will be described in more detail by using exemplary embodiments and by reference to the drawings, wherein FIG. 1—is a schematic partial view of a 3D imaging system connected with a handheld intraoral dental 3D camera according to an embodiment of the present invention.

DETAILED DESCRIPTION OF THE INVENTION

Figure 1:
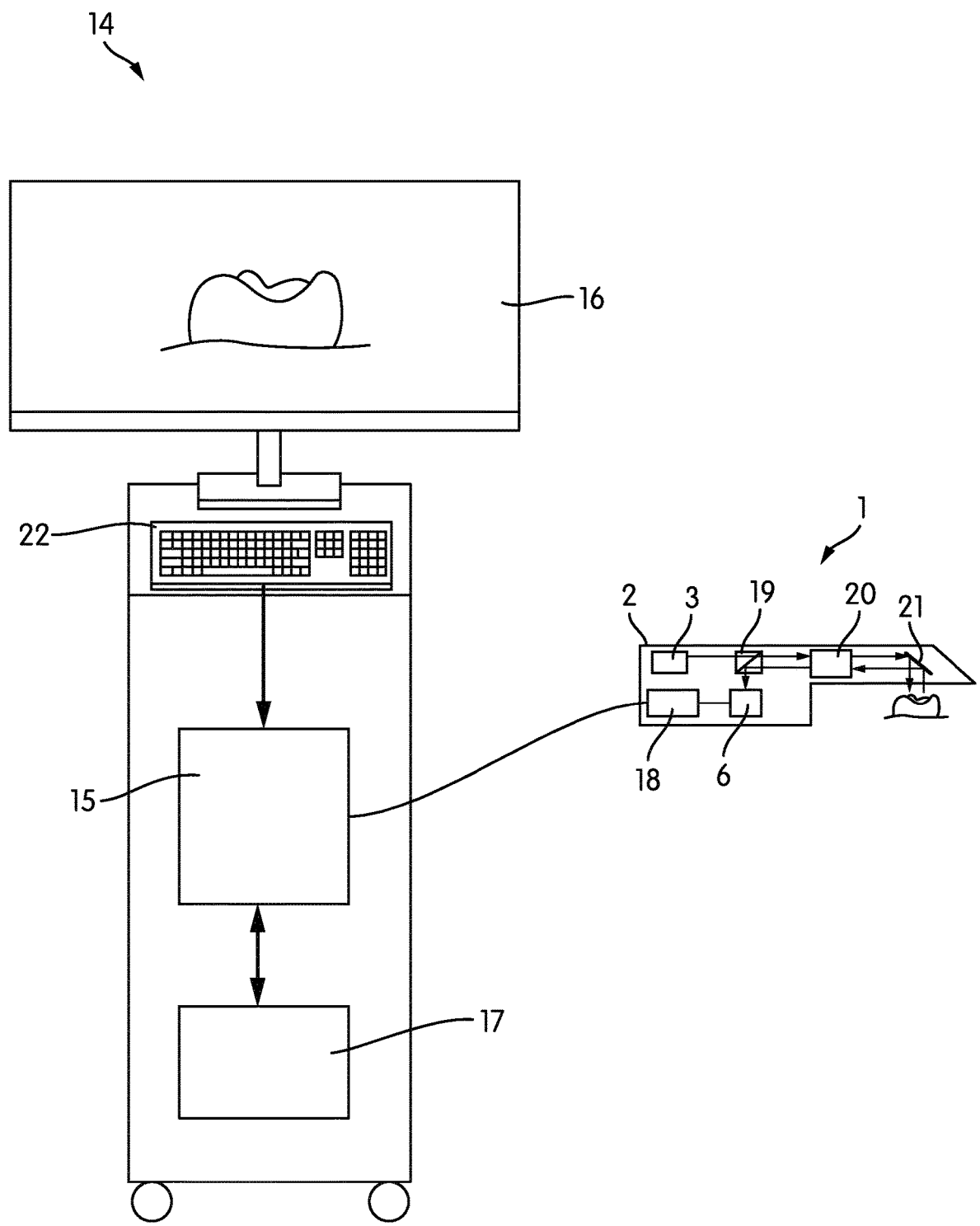

The reference numbers shown in the drawings denote the elements as listed below and will be referred to in the subsequent description of the exemplary embodiments:
1. Handheld intraoral dental 3D camera
2. Hand-held housing
3. Optical unit
4. Illuminating means
5. Projecting means
6. Sensing unit
7. Semiconductor laser
8. Phosphor
9. Cooling plate
10. Reflective section
11. First lens
12. Dichroic mirror
    12a. Dichroic mirror
    12b. Dichroic mirror
13. Second lens
14. 3D imaging system
15. 3D image processing unit
16. Display
17. Data storage
18. Preprocessing unit
19. Beam splitter
20. Imaging unit (lens)
21. Mirror
22. Input means (keyboard & mouse)

FIG. 1 shows an embodiment of a 3D imaging system (14) which is connected with a handheld intraoral dental 3D camera (1). The 3D imaging system (14) has a 3D image processing unit (15) for constructing a 3D image of at least part of the tooth surface of the patient based on the images sensed by the handheld intraoral dental 3D camera (1). The 3D imaging system (14) has a display (16) for displaying the 3D image to a user. The 3D imaging system (14) has a data storage for storing the sensed images and a keyboard (22) for user input.

As shown in FIG. 1 the handheld intraoral dental 3D camera (1) has a hand-held housing (2) which includes: an optical unit (3) comprising: an illuminating means (4) for producing light, and a projecting means (5) for projecting the light produced by the illuminating means (4) onto a region of a tooth surface of a patient; a sensing unit (6) for sensing an image of the projected light reflected by the region. The sensed images are preprocessed by a preprocessing unit (18) which transmits the preprocessed images to the 3D imaging system (14).

Figure 2:
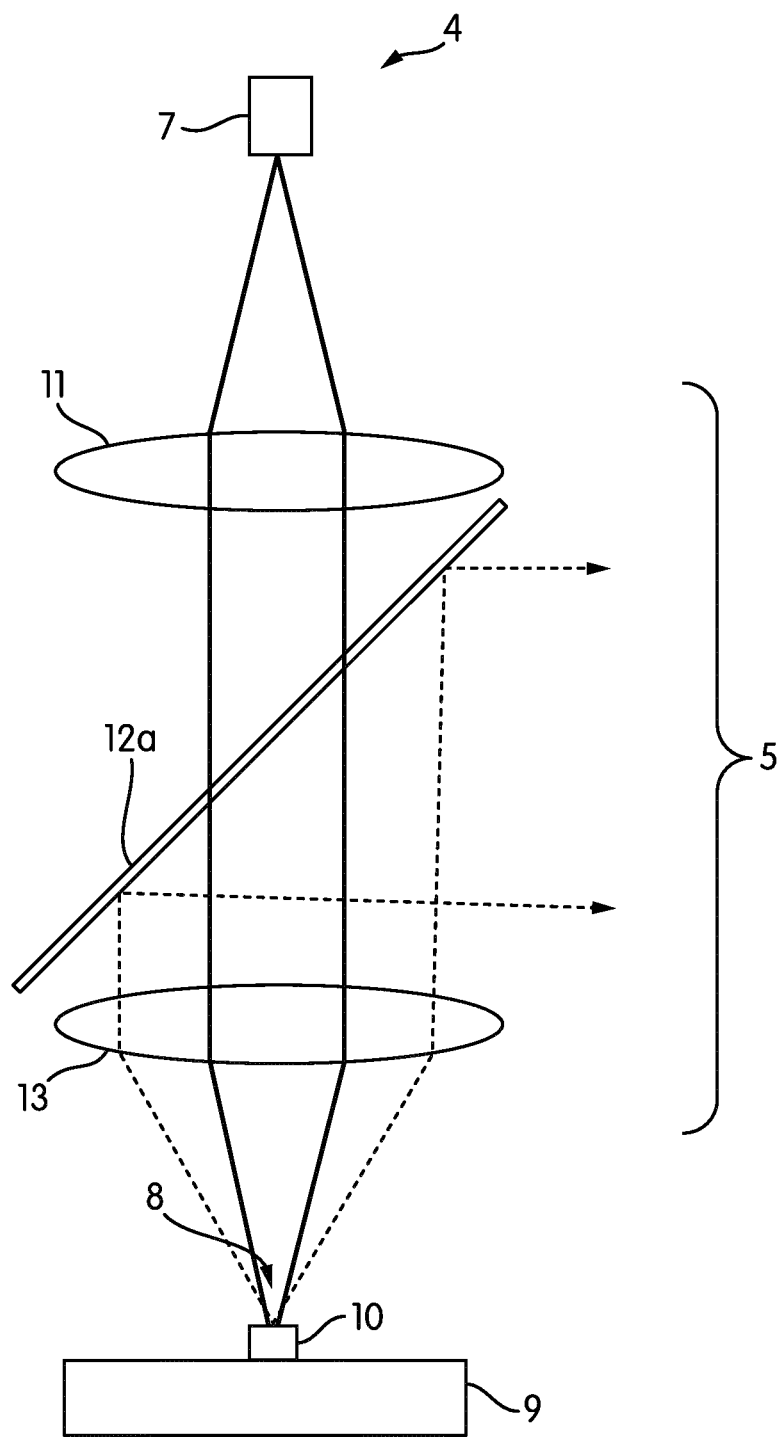
FIG. 2—is a schematic partial view of the optical unit of the handheld intraoral dental 3D camera of FIG. 1 according to an embodiment of the present invention.
Figure 3:
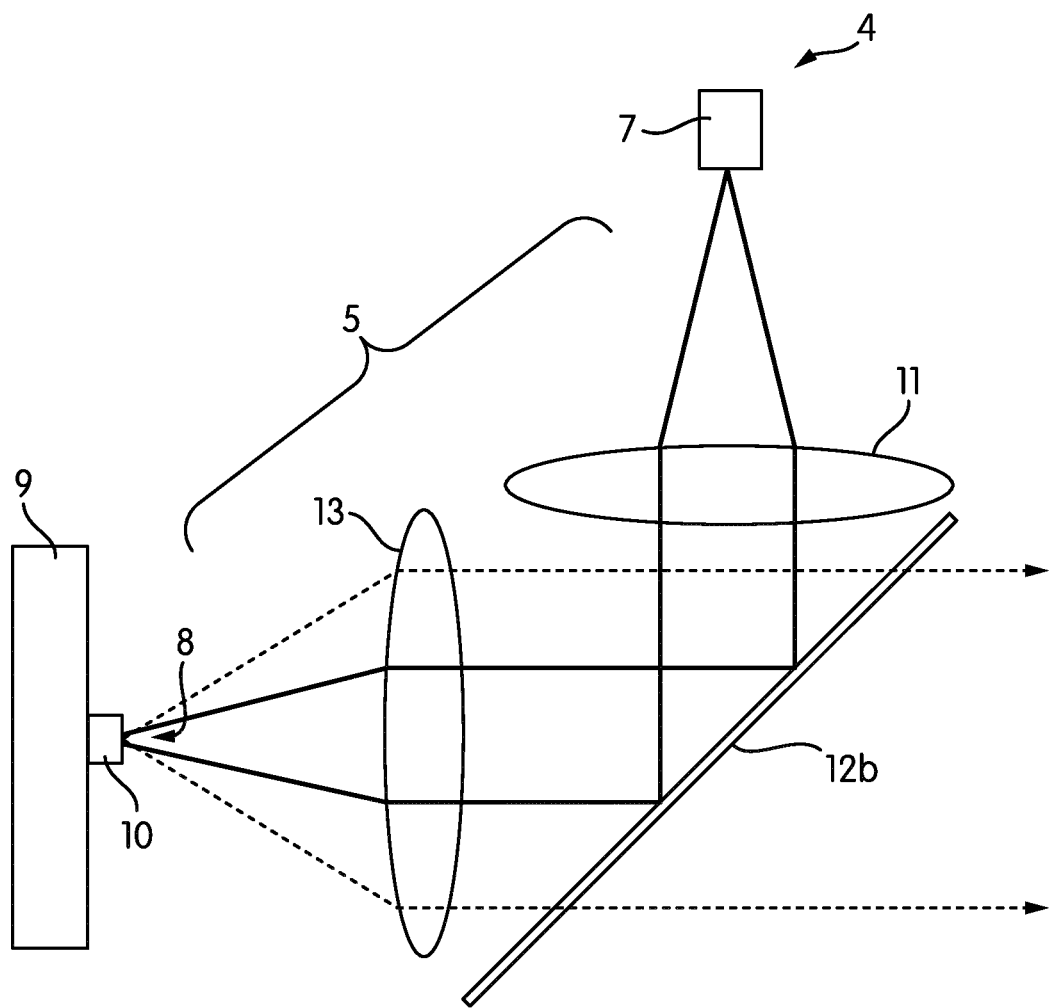
FIG. 3—is a schematic partial view of the optical unit of the handheld intraoral dental 3D camera of FIG. 1 according to an alternative embodiment of the present invention.

FIG. 2 and FIG. 3 are alternative embodiments of the optical unit (3) shown in FIG. 1. As shown in FIG. 2 and FIG. 3, the illuminating means (4) comprises a semiconductor laser (7) for producing the light. The projection means (5) comprises phosphor (8) which is remotely arranged to receive the light produced by the semiconductor laser (7). The projection means (5) is further adapted to condense the light of the semiconductor laser (7) onto the phosphor (8), and to project the fluorescing light from the phosphor (8) onto the region of the tooth surface of the patient. The projection means (5) will described later in more detail. As shown in FIG. 1, the projected light of the projection means (5) is directed towards a beam splitter (19), an imaging lens (20), a mirror (21), and therefrom to the region of the tooth surface of the patient. The projected light reflected by the region is reflected by the mirror (21) to the imaging lens (20), the beam splitter (19), and therefore to the sensing unit (6).

As shown in FIG. 2 and FIG. 3, the projection means (5) comprises a cooling plate (9) which serves as a heat sink. The cooling plate (9) has a reflective section (10). The phosphor (8) is arranged in the reflective section (10) in thermal contact with the cooling plate (9). The cooling plate (9) and the reflective section (10) are made of metal. The phosphor (8) is concentrated within a spot like area in the reflective section (10). The diameter of the spot like area preferably ranges between 0.1 to 1 millimeters and matches the geometry of the condensed light. The diameter of the laser beam emitted from the semiconductor laser (7) preferably ranges also between 0.1 to 1 millimeters so to match the spot like area of the phosphor (8). The resulting fluorescent light from the phosphor (8) has a very high luminance. Due to the small diameter of the spot like area of the phosphor (8), the fluorescent light can be effectively collected and also guided through the optical unit (3) with a large f-stop (corresponding to a small NA). The semiconductor laser (7) emits light preferably within the range of 350 nm to 470 nm. The semiconductor laser (7) preferably emits blue light. Alternatively, the semiconductor laser (7) may be adapted to emit UV light.

FIG. 2 shows a first alternative embodiment of the optical unit (3). The projection means (5) comprises at least a first lens (11), a dichroic mirror (12a) and a second lens (13) arranged in the given order along the optical path from the semiconductor laser (7) to the phosphor (8).

The first lens (11) collects the divergent light from the semiconductor laser (7) and collimates it towards the dichroic mirror (12a) which is adapted to transmit the light from the semiconductor laser (7) towards the second lens (13). The second lens (13) focuses the light onto the phosphor (8). The fluorescent light emitted by the phosphor (8) is collected by the second lens (13) and collimated towards the dichroic mirror (12a) which is adapted to reflect the collimated fluorescent light towards beam splitter (19).

FIG. 3 shows a second alternative embodiment of the optical unit (3). The projection means (5) comprises at least a first lens (11), a dichroic mirror (12b) and a second lens (13) arranged in the given order along the optical path from the semiconductor laser (7) to the phosphor (8). The first lens (11) collects the divergent light from the semiconductor laser (7) and collimates it towards the dichroic mirror (12b) which is adapted to reflect the light from the semiconductor laser (7) towards the second lens (13). The second lens (13) focuses the light onto the phosphor (8). The fluorescent light emitted by the phosphor (8) is collected by the second lens (13) and collimated towards the dichroic mirror (12a) which is adapted to transmit the collimated fluorescent light towards beam splitter (19).

The projection means (5) is further adapted to generate a pattern by using the collimated fluorescent light of the phosphor (8) and to project the generated pattern onto the region of the tooth surface of the patient. The pattern is preferably generated via a mask arranged between the dichroic mirror (12a;12b) and the beam splitter (19).

As shown in FIG. 3, the cooling plate (9) is arranged at a rear portion of the Hand-held housing (2), namely furthest away from the beam splitter (19), the imaging unit (20), and the mirror (21). Thereby, any adverse effect of the waste heat on the imaging process can be reduced as much as possible.

The invention claimed is:

1. A handheld intraoral dental 3D camera comprising:
a hand-held housing comprising:
an optical unit comprising: an illuminating means configured to produce light, and a projecting means configured to project the light produced by the illuminating means onto a region of a tooth surface of a patient,
a sensing unit configured to sense an image of the projected light reflected by the region,
wherein the illuminating means comprises a semiconductor laser configured to produce the light; and
the projection means comprises phosphor which is remotely arranged to receive the light produced by the semiconductor laser, wherein the projection means is further configured to condense the light of the semiconductor laser onto the phosphor, and to project the fluorescent light from the phosphor onto the region of the tooth surface of the patient.

2. The handheld intraoral dental 3D camera according to claim 1, wherein the projection means comprises a cooling plate comprising a reflective section, wherein the phosphor is arranged on the reflective section in thermal contact with the cooling plate.

3. The handheld intraoral dental 3D camera according to claim 1, wherein the phosphor which is arranged to receive the condensed light is concentrated within an area having a diameter in the range of 0.1 mm to 1 mm.

4. The handheld intraoral dental 3D camera according to claim 1, wherein the semiconductor laser emits blue light or UV light within the range of 350 nm to 470 nm.

5. The handheld intraoral dental 3D camera according to claim 1, wherein the projection means comprises at least a first lens, a dichroic mirror and a second lens arranged in the given order along the optical path between the semiconductor laser and the phosphor.

6. The handheld intraoral dental 3D camera according to claim 1, wherein the projection means is further configured to generate a pattern with the fluorescent light of the phosphor and project the generated pattern onto the region of the tooth surface of the patient.

7. A 3D imaging system comprising:
the handheld intraoral dental 3D camera according to claim 1;
a 3D image processing unit configured to generate a 3D image of at least part of the tooth surface of the patient based on the sensed images; and
a display for configured to display the 3D image to a user.

* * * * *